US011497947B2

(12) United States Patent
Kushniruk et al.

(10) Patent No.: US 11,497,947 B2
(45) Date of Patent: Nov. 15, 2022

(54) RESCUE RIG

(71) Applicants: Roman Kushniruk, Sylvan Lake (CA); Kim Webber, Sexsmith (CA)

(72) Inventors: Roman Kushniruk, Sylvan Lake (CA); Kim Webber, Sexsmith (CA)

( * ) Notice: Subject to any disclaimer, the term of this patent is extended or adjusted under 35 U.S.C. 154(b) by 538 days.

(21) Appl. No.: 16/590,271

(22) Filed: Oct. 1, 2019

(65) Prior Publication Data
US 2021/0093905 A1   Apr. 1, 2021

(51) Int. Cl.
*A62B 35/00* (2006.01)
*A01M 31/00* (2006.01)
*B65G 7/12* (2006.01)

(52) U.S. Cl.
CPC ....... *A62B 35/0006* (2013.01); *A01M 31/006* (2013.01); *B65G 7/12* (2013.01)

(58) Field of Classification Search
CPC ............ A62B 35/0006; A62B 35/0018; A62B 35/0025; A62B 35/0031; A01M 31/006; A61G 7/1023; B65G 7/12
USPC .............................................. 294/140; 182/3
See application file for complete search history.

(56) References Cited

U.S. PATENT DOCUMENTS

| | | | |
|---|---|---|---|
| 4,747,797 A | 5/1988 | Hindle | |
| 5,016,299 A * | 5/1991 | Boulanger | A61G 7/0504 5/81.1 R |
| 5,027,833 A * | 7/1991 | Calkin | A61F 5/05883 128/869 |
| 5,080,191 A * | 1/1992 | Sanchez | A47D 13/086 280/801.1 |
| RE35,028 E | 8/1995 | Casebolt et al. | |
| 5,787,529 A | 8/1998 | Landes | |
| 6,874,596 B2 | 4/2005 | Zeissler et al. | |
| 7,610,641 B2 * | 11/2009 | Frost | A61G 7/1051 5/628 |
| 7,673,945 B1 | 3/2010 | Riftel et al. | |
| 8,584,799 B1 * | 11/2013 | Dennington | A62B 35/04 182/4 |
| 9,687,083 B1 * | 6/2017 | Romero | A47D 13/025 |
| 2009/0255756 A1 * | 10/2009 | Green | A62B 35/0018 182/3 |
| 2010/0005593 A1 * | 1/2010 | Bowling | A61G 1/013 5/628 |

* cited by examiner

*Primary Examiner* — Dean J Kramer

(57) ABSTRACT

An illustrated view of an exemplary rescue rig for rescue and recovery of a person, such as an oil field worker, soldier, etc., animal, supplies, etc. The rescue rig is useful for efficient and effective rescue when a man or person is down. The rescue rig is useful for quick, efficient and effective outfitting of a down person such that rescue can occur quickly thereby rescuers out of dangerous situations or terrains quickly. The rescue rig allows for a smaller rescuer to be able to rescue a bigger man down. The rescue rig is preferably made of a nylon material, however other materials are hereby contemplated, including, but not limited to, Kevlar®, Nomex®, Dyneema®, etc. The rescue rig has a main strap, torso portion, a head portion and a rescuer portion.

9 Claims, 1 Drawing Sheet

RESCUE RIG

FIELD OF THE INVENTION

This invention relates to rescue devices. More particularly, it relates to rig for rescuing people.

BACKGROUND

Rescue comprises responsive operations that usually involve the saving of life, or prevention of injury during an incident or dangerous situation.

Tools used might include search and rescue dogs, mounted search and rescue horses, helicopters, the "jaws of life", and other hydraulic cutting and spreading tools used to extricate individuals from wrecked vehicles. Rescue operations are sometimes supported by special vehicles such as fire department's or EMS heavy rescue vehicle.

A helicopter rescue basket is a basket suspended below a helicopter in order to rescue people from a fire or other disaster site.

There are two main types of helicopter baskets. The smaller, more common type is used by rescuers to lift a person up from ground or water into the helicopter.

The second type is a new invention. This is a basket able to fit five people or more. It allows a large group of people to be rescued from a fire or other emergency site, without needing to load them into the helicopter itself. It enables the helicopter to load a large group without landing. The helicopter hovers over the site and rests the basket on the ground or other surface. Evacuees board, then are transported to a safe area.

Search and rescue (SAR) is the search for and provision of aid to people who are in distress or imminent danger. The general field of search and rescue includes many specialty sub-fields, typically determined by the type of terrain the search is conducted over. These include mountain rescue; ground search and rescue, including the use of search and rescue dogs; urban search and rescue in cities; combat search and rescue on the battlefield and air-sea rescue over water.

Cave rescue is a highly specialized form of rescue for rescuing injured, trapped or lost cave explorers. Combat search and rescue (CSAR) is search and rescue operations that are carried out during war that are within or near combat zones.

Cave rescue, combat rescue, etc. are similar in that tight and dangerous spaces are encountered. Often minutes if not seconds are the only amount of time to save those fallen people. In combat, a motto "no man left behind", requires that each and every soldier, whether alive or dead, must be recovered by another soldier. The danger is not only on the fallen soldier, but also the soldier rescuing the fallen soldier, therefore time is of the essence. Today, the fallen soldier is either pull behind friendly lines or taken in a fireman's carry to safe ground. This is time consuming and places the rescuing soldier and the fallen soldier in dire straights from enemy fire.

In light of the foregoing, there is a need for a device which can be an efficient and easily used device to rescue people when unable to find safety. The device must be light, easy to use and transportable. The ability to use the device in tight spaces is also required.

DETAILED DESCRIPTION

Figure 1:
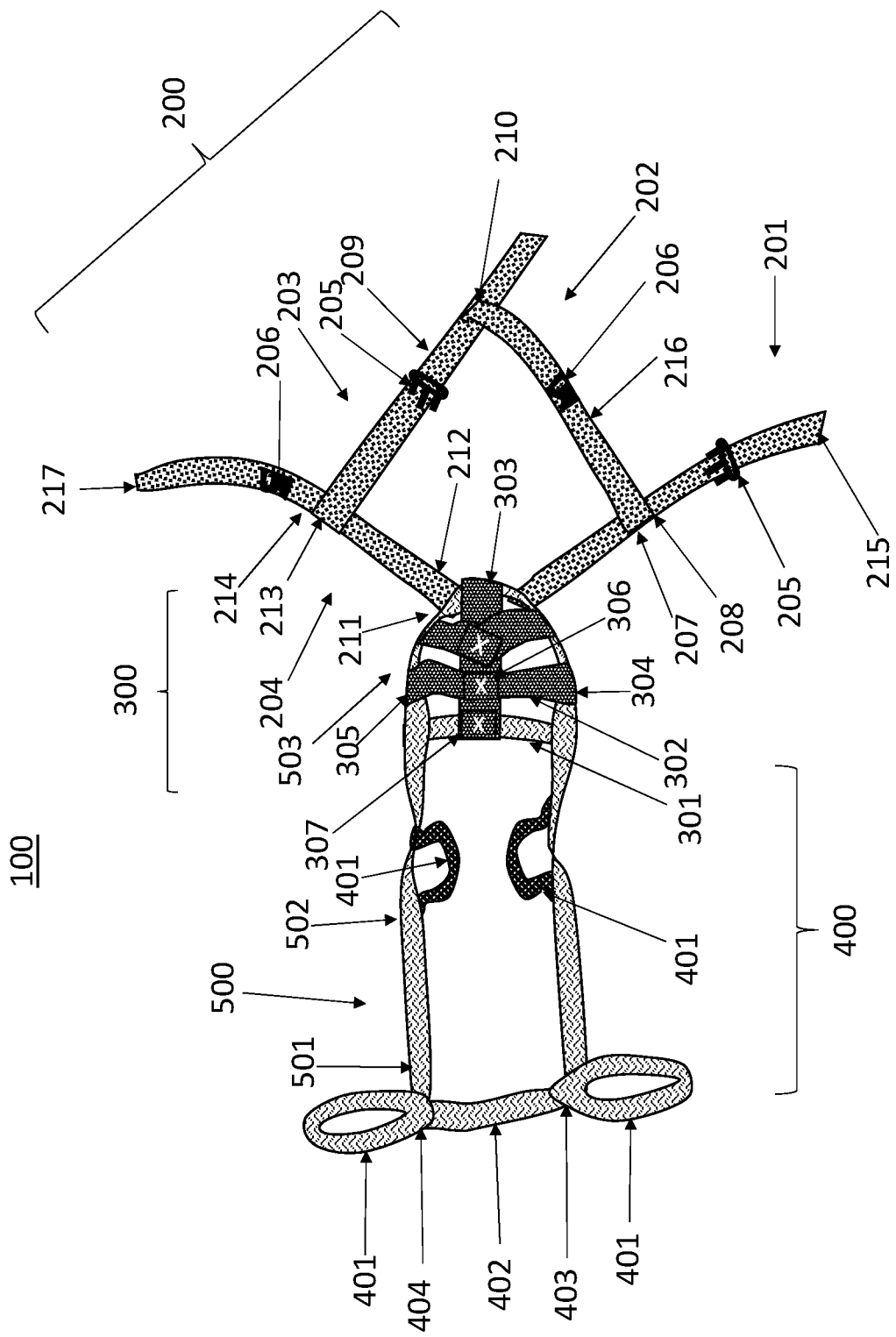
FIG. 1 is an illustrated view of an exemplary rescue rig.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Above," "adhesive," "affixing," "any," "around," "both," "bottom," "by," "comprising," "consistent," "customized," "enclosing," "friction," "in," "labeled," "lower," "magnetic," "marked," "new," "nominal," "not," "of," "other," "outside," "outwardly," "particular," "permanently," "preventing," "raised," "respectively," "reversibly," "round," "square," "substantial," "supporting," "surrounded," "surrounding," "threaded," "to," "top," "using," "wherein," "with," or other such descriptors herein are used in their normal yes-or-no sense, not as terms of degree, unless context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Referring to FIG. 1, an illustrated view of an exemplary rescue rig 100 for rescue and recovery of a person, such as an oil field worker, soldier, etc., animal, supplies, etc. The rescue rig 100 is useful for efficient and effective rescue when a man or person is down. The rescue rig 100 is useful for quick, efficient and effective outfitting of a down person such that rescue can occur quickly thereby rescuers out of dangerous situations or terrains quickly. The rescue rig 100 allows for a smaller rescuer to be able to rescue a bigger man down.

The rescue rig 100 is preferably made of a nylon material, however other materials are hereby contemplated, including, but not limited to, Kevlar®, Nomex®, Dyneema®, etc.

The rescue rig 100 has a main strap 500, torso portion 200, a head portion 300 and a rescuer portion 400. The torso portion 200 is preferably be for coupling to a torso of a fallen person. The head portion being for coupling to a neck and head of a fallen person. The rescuer portion for being coupled to the rescuer. The main strap 500 is configured to be utilized by the head portion 300 and the rescuer portion 400.

The main strap 500 of the rescue rig 100 is preferably made of a nylon material, however other materials are hereby contemplated, including, but not limited to, Kevlar®, Nomex®, Dyneema®, etc. The main strap 500 has an upper portion 501, a middle portion 502 and a lower portion 503. The main strap 500 is preferably an elongated "U" shape. The lower portion 503 being configured as the head portion 300. The upper portion of the main strap 500 being configured as the rescuer portion 400.

The torso portion 200 has a plurality of straps 201, 202, 203, 204, a plurality of male coupling devices 205 and a plurality of female coupling devices 206.

The plurality of straps 201, 202, 203, 204 of the torso portion 200 of the rescue rig 100 are preferably made of a nylon material, however other materials are hereby contemplated, including, but not limited to, Kevlar®, Nomex®, Dyneema®, etc. Each of the plurality of straps 201, 202, 203, 204 of the torso portion 200 of the rescue rig 100 may be the same length or a different length than any other of the plurality of straps 201, 202, 203, 204 of the torso portion 200 of the rescue rig 100.

A middle portion 207 of the first of the plurality of straps 201 of the torso portion 200 of the rescue rig 100 is securely coupled to a first end 208 of the second of the plurality of straps 202 of the torso portion 200 of the rescue rig 100 by a securing device. The securing device is preferably a stitching of a nylon thread material, however other materials are hereby contemplated, including, but not limited to, Kevlar® thread, Nomex® thread, Dyneema® thread, etc.

A middle portion 209 of the third of the plurality of straps 203 of the torso portion 200 of the rescue rig 100 is securely coupled to a second end 210 of the second of the plurality of straps 202 of the torso portion 200 of the rescue rig 100 by the securing device.

A first end 211 of the first of the plurality of straps 201 is securely coupled to substantially near a first end 212 of the fourth of the plurality of straps 204 by the securing device. A first end 213 of the third of the plurality of straps 203 is securely coupled to substantially near a middle portion 214 of the fourth of the plurality of straps 204 by the securing device.

One of the male coupling devices 205 is coupled substantially between the middle portion 207 of the first of the plurality of straps 201 and a second end 215 of the first of the plurality of straps 201 by the securing device. Another of the male coupling devices 205 is coupled substantially between the middle portion 208 of the third of the plurality of straps 201 and the first end 213 of the third of the plurality of straps 203 by the securing device.

One of the female coupling devices 206 is coupled substantially near a middle portion 216 of the second of the plurality of straps 202. Another of the female coupling devices 206 is coupled substantially between the middle portion 214 of the fourth of the plurality of straps 204 and a second end 217 of the fourth of the plurality of straps 204 by the securing device.

When placed around a fallen person, the plurality of straps 201, 202, 203, 204 are configured to be around the torso of the fallen person. The male coupling device 205 coupled to the first of the plurality of straps 201 is configured to be removably and securely coupled to the female coupling device 206 coupled to the fourth of the plurality of straps 204. The male coupling device 205 coupled to the third of the plurality of straps 203 is configured to be removably and securely coupled to the female coupling device 206 coupled to the second of the plurality of straps 202. The male coupling devices 205 and the female coupling devices 206 are adjustable to location on the plurality of straps 201, 202, 203, 204 to fit tightly around the torso of the person.

The first end 211 of the first of the plurality of straps 201 of the torso portion 200 being securely coupled to the lower portion 503 of the main strap 500. The first end 212 of the fourth of the plurality of straps 204 of the torso portion 200 being securely coupled to the lower portion 503 of the main strap 500.

The head portion 300 of the rescue rig 100 has a top strap 301, one or more cross straps 302 and a middle strap 303. The top strap 301 is coupled to substantially near the middle portion 502 of the main strap 500. The top strap 301 of the head portion 300 configured to be at a top of the head of the person. The head portion 300 is configured to securely and tightly secure the head of the person.

The top strap 301 of the head portion 300 of the rescue rig 100 are preferably made of a nylon material, however other materials are hereby contemplated, including, but not limited to, Kevlar®, Nomex®, Dyneema®, etc. The cross straps 302 of the head portion 300 of the rescue rig 100 are preferably made of a nylon material, however other materials are hereby contemplated, including, but not limited to, Kevlar®, Nomex®, Dyneema®, etc.

The cross straps 302 of the head portion 300 are equally spaced between the top strap 301 of the head portion 300 and the lower portion 503 of the main strap 500. The cross straps 302 having a first end 304, a second end 305 and a middle portion 306. The middle portion 306 of the cross straps 302 and the top strap 301 are configured to have a slotted pockets 307 such that the middle strap 303 is movably and adjustably coupled through the slotted pockets 307 of the cross straps 302. The first end 304 of the cross straps 302 is securely coupled to significantly near the lower portion 503 of the main strap 500. The middle strap 303 is coupled to the lower portion 503 of the main strap 500 substantially near the torso portion 200.

The slotted pockets 307 of the head portion 300 of the rescue rig 100 are preferably made of a nylon material, however other materials are hereby contemplated, including, but not limited to, Kevlar®, Nomex®, Dyneema®, etc.

The rescue portion 400 has a plurality of handles 401 and an end strap 402. The end strap 402 is useful for stabilizing the formation of the main strap 500. The end strap 402 has a first end 403 and a second end 404. The first end 403 of the end strap 402 and the second end 404 of the end strap 402 are coupled to the upper portion 501 of the main strap 500.

The end strap 402 of the rescuer portion 400 of the rescue rig 100 is preferably made of a nylon material, however other materials are hereby contemplated, including, but not limited to, Kevlar®, Nomex®, Dyneema®, etc. The handles 401 of the rescuer portion 400 of the rescue rig is preferably made of a rubber material, however other materials are hereby contemplated, including, but not limited to, nylon, Kevlar®, Nomex®, Dyneema®, etc.

The plurality of handles 401 of the rescuers portion 400 are useful for providing a gripping location for the rescuer to be able to move the person to safety. The plurality of handles 401 are coupled to the upper portion 501 of the main strap 500 significantly near the end strap 402 of the rescuer portion 400. Others of the plurality of handles 401 are securely coupled to substantially the middle portion 502 of the main strap 500.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A rescue rig for recover and rescue of humans, animals, supplies, the rescue rig comprising:
    a main strap, a head portion and a torso portion;
    the torso portion having a plurality of straps, a plurality of male couplings and a plurality of female couplings, wherein when one of the male couplings is coupled to one of the female couplings form a securing device, wherein a first of the straps being coupled to a second of the straps by the securing device, wherein the second of the straps being coupled to a third of the straps by the securing device, wherein the third of the straps being coupled to a fourth of the straps by the securing device, wherein the first of the straps being coupled to the fourth of the straps by the securing device, and wherein the female couplings being coupled to the second of the straps and the fourth of the straps, and wherein the male couplings being configured to be coupled to the first of the straps and the third of the straps;
    the main strap having an upper portion, a lower portion and a middle portion, wherein the first of the straps of the torso portion being securely coupled to substantially near the lower portion of the main strap, and wherein the fourth of the straps of the torso portion being securely coupled to substantially near the lower portion of the main strap;
    the head portion having a plurality of cross straps, a top strap, a middle strap and a plurality of slotted pockets, wherein the cross straps being coupled to the lower portion of the main strap, wherein the top strap being coupled to substantially the middle portion of the main strap, wherein the middle strap being coupled to the main strap and wherein the middle strap being movably and adjustably coupled through the slotted pockets coupled to the plurality of straps and the top strap; and
    a rescuers portion, the rescuers portion having a plurality of handles and an end strap, wherein the end strap being coupled to the upper portion of the main strap, wherein the handles being coupled to the upper portion of the main strap and wherein the handles further being coupled to substantially near the middle portion of the main strap.

2. The rescue rig of claim 1, wherein the plurality of straps of the torso portion being made of a nylon material.

3. The rescue rig of claim 1, wherein the main strap being made of a nylon material.

4. The rescue rig of claim 1, wherein the cross straps of the head portion being made of a nylon material.

5. The rescue rig of claim 1, wherein the top strap of the head portion being made of a nylon material.

6. The rescue rig of claim 1, wherein the end strap of the rescuers portion being made of a nylon material.

7. The rescue rig of claim 1, wherein the handles of the rescuers portion being made of a rubber material.

8. The rescue rig of claim 1, wherein each of the plurality of straps of the torso portion being the same length.

9. The rescue rig of claim 1, wherein each of the plurality of straps of the torso portion being a different length than at least one of the other of the plurality of straps of the torso portion.

* * * * *